United States Patent [19]
Baldwin et al.

[11] Patent Number: 6,018,701
[45] Date of Patent: Jan. 25, 2000

[54] FALSE NULL PREVENTION IN OPTICAL DELAY LINE CALIBRATION

[75] Inventors: David L. Baldwin; David A. Bailey, both of Glendale, Ariz.

[73] Assignee: Honeywell Inc

[21] Appl. No.: 08/921,788

[22] Filed: Sep. 2, 1997

[51] Int. Cl.[7] .............................. G06F 15/20; H04B 10/08
[52] U.S. Cl. ........................... 702/85; 702/104; 702/119; 385/76; 385/88; 359/123; 359/128
[58] Field of Search ...................................... 359/158, 110, 359/123, 128; 702/85, 104, 119; 324/202, 69; 385/76, 88

[56] References Cited

PUBLICATIONS

"Architectures & performance of microwave links in phased antenna systems" by Baldwin and T.A. Garas, No Date.
Chapter 13 of Publication entitled, "photonic Aspects of morden Radar" by Zmuda & Edward N. Toughlian (Artech House, Inc.), 1994.

*Primary Examiner*—Kamini Shah
*Attorney, Agent, or Firm*—Charles J. Ungemach

[57] ABSTRACT

A method and apparatus for preventing false nulls in an optical delay line by causing the input optical beam to be frequency modulated or variably time delayed so that the components of the optical signal in the output cannot be of equal magnitude and of opposite phase.

25 Claims, 1 Drawing Sheet

FALSE NULL PREVENTION IN OPTICAL DELAY LINE CALIBRATION

CROSS REFERENCE TO RELATED APPLICATIONS

U.S. Patent application entitled "Method and Apparatus to Calibrate And Run Optical Delay Devices" by Baldwin et al Ser. No. 08/900,245 filed Jul. 24, 1997, and assigned to the assignee of the present invention.

US GOVERNMENT RIGHTS

The United States Government has rights in this invention pursuant to a Contract awarded to the employer of the inventors herein.

BACKGROUND OF INVENTION

1. Field of the Invention

This invention relates to the prevention of false nulls when calibrating an optical delay system and more particularly, the prevention of false nulls in a method and apparatus to overcome problems associated with the drift of the bias voltages used for the optical switches of an optical delay line.

2. Description of the Prior Art

In the above mentioned Baldwin et al application, a system for calibrating an optical delay line circuit is shown which employs a plurality of optical switches operating in accordance with applied bias voltages to switch an optical beam from one path to one of two alternate paths. In this system, an output leakage signal is observed and when the output leakage signal becomes greater than a predetermined value, it is determined that at least one of the bias voltages have drifted and the system should be recalibrated, (either while the system is running or during a very short idle period), by changing the bias voltages to the optical switches so to bring the output to a low or null value below the predetermined value. A null condition occurs, not only when all of the switches are biased correctly but also sometimes under incorrect bias conditions when using input light that has a single mode. With a single mode light source, the output signal can have two components that have traveled through the delay system over different paths and occasionally, one of these components becomes substantially equal in magnitude but opposite in phase to the other component with the result that they cancel out creating a false null. When using sources that have multiple modes, a reversal in phase of one of the modes will not produce a false null because the other modes will not be reversed at the same time. It is desirable to use a single mode source since, among other advantages, the available modulation bandwidth is greater. However, when using single mode light sources (e.g., distributed feedback diode lasers or solid state NdYAG lasers) optical interference of the light in the delay line may result in false nulls by destructive interference. Since these false nulls are not related to the proper bias voltages being applied to the switches, such situations could cause the system to bias the switches at an improper value and produce erroneous operation of the system.

SUMMARY OF THE INVENTION

The present invention overcomes the problem of false nulls in a single mode light source by varying a second characteristic such as light frequency in the delay line.

DETAILED DESCRIPTION OF THE PREFERRED EMBODIMENTS

Figure 1:
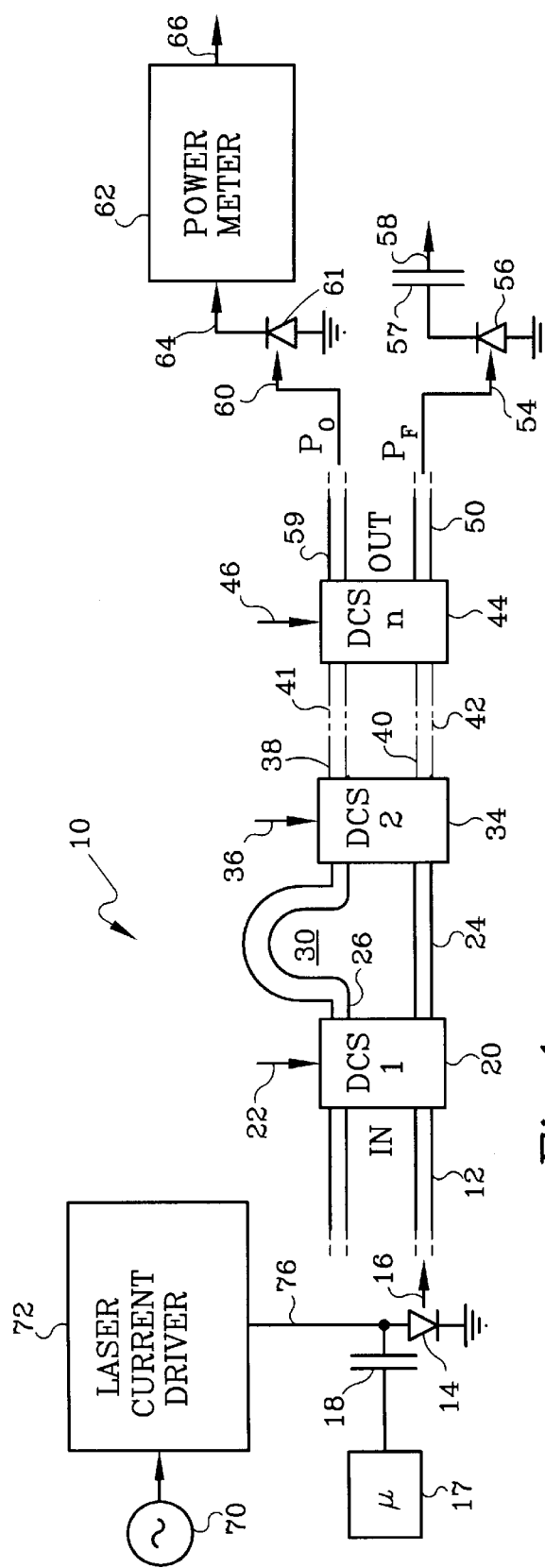
FIG. 1 is a block diagram of an optical delay system employing one implementation of the present invention; and, FIG. 2 is a block diagram of part of the optical delay system of FIG. 1 but employing another implementation of the present invention.

In FIG. 1, a portion of a delay circuit such as shown in the above referenced Baldwin et al application is shown by reference numeral 10. Delay circuit 10 has an input fiber 12 into which a source of light 14 introduces a beam shown by arrow 16. The source of light 14 is shown as a diode laser which produces a single mode, but other sources of single mode light may be used. Because optical delay systems are often used in a microwave antenna environment, a microwave source 17 is shown connected through a capacitor 18 to modulate the light source 14. The optical beam introduced into fiber 12 is controlled by a switch 20 that is biased by a voltage on an input 22 to either cause the beam to exit on a lower fiber 24 (through put) or to cross over and exit on an upper fiber 26. The upper fiber 26 leads into a delay path shown as a loop 30 which leads to a second switch 34 biased by a voltage on an input 36. Switch 34, like switch 20 controls the beam so that it exits either on an upper fiber 38 (through put) or crosses over to a lower fiber 40. This procedure continues through a number of switches shown by dashed lines 41 and 42 to a final switch 44 biased by a voltage on an input 46. The last switch 44 causes the light to exit on the lower fiber 50 and the final output on a line 54 is used as the output signal for an optical converter shown as a photodiode 56 which operates through a capacitor 57 to produce a corresponding time delayed electric signal on an output line 58 to be used by downstream equipment such as microwave antennas (not shown). If all of the switches are biased correctly, then the entire output exits the delay system on lower fiber 50 and there is no output signal in an upper fiber 59 of the final switch 44. It should be noted that a signal which traverses the entire lower path, i.e. with a minimum distance or delay, may be considered as a reference signal against which the output on fiber 50 is compared to determine the amount of delay caused by one or more excursion into the upper fibers and through one or more delay loops such as 30.

If the bias voltages are not correct, then some signal passes through some switch into the wrong path and there will be a split at switch 44 producing some output signal in fiber 59 to produce an output on the upper line shown as arrow 60. This signal is also converted to an electrical signal by a photodiode 61 and presented to a power meter 62 via an input shown as arrow 64. When the signal on input 64 is above a predetermined value as determined by the power meter 62, it indicates that one or more biases are incorrect somewhere in the system and, accordingly, an error signal is produced at an output shown by arrow 66 which, as in the above referenced Baldwin et al application, is used to calibrate the various bias voltages in accordance with a predetermined algorithm. The calibration process works to reduce the signal on input 64 to a low or null value at which point the system is considered recalibrated.

Unfortunately, as mentioned, when the source is a single mode laser, the problem of false nulls may occur because of the reversal of the phase of the two components in the output signal in line 60 by 180 degrees. When the two components are of the same magnitude and of opposite phase, it will effectively cancel the output signal and produce a false null indicating that the switches are properly biased when they are not.

This problem is over come in the FIG. 1 embodiment, by supplying an additional frequency for the input light. As seen in FIG. 1, a signal generator 70 is shown supplying a signal to a laser current driver box 72 which then produces a bias current to the diode laser 14 via line 76. The result is that the input light from diode laser 14 is frequency modulated so that the frequency of the beam through the delay circuit varies back and fourth over a range of frequencies and is no longer of a single mode. Thus, even if two components are of the same size and of opposite phase, this will not be true of other frequencies and a significant output on line 60 will exist until the bias voltages are recalibrated. In other words, there can no longer be any false nulls and the output on line 58 can reliably be used.

A similar result may be accomplished by introducing a characteristic such as phase, amplitude and/or polarization in the delay line. These other characteristics are inserted inside the delay line as, for example a modulation signal may be introduced inside the switches or at the outputs thereof with a small variable delay. The varying delay may even be introduced by periodically stretching the optical fibers to produce momentary path length changes. It should be understood that the alternate characteristic, whether it be phase, amplitude or polarization, should be applied to that portion of the light that undesirably leaks from a switch because of an incorrect bias. If all of the biases are correct, then it makes no difference whether there is another characteristic since all of the light will emerge from the lower fiber 50 in FIG. 1 and no destructive interference can take place. Accordingly, when a characteristic is internally inserted into the light traveling through the delay line, it will be necessary to do so to that light which could emerge from the wrong switch output. As will be seen, this is accomplished in FIG. 2 by placing modulators that can alter the light characteristics on both fibers between each pair of switches.

Figure 2:
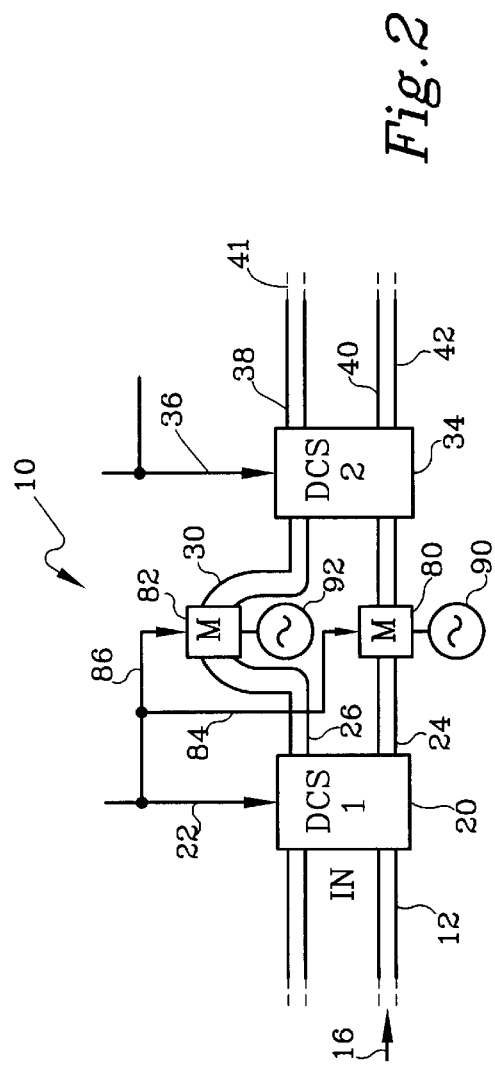

In FIG. 2, the delay circuit is shown as being the same as in FIG. 1 except that the signal generator 70 and laser current driver 72 are not needed and modulators, such as identified by reference numerals 80 and 82, are inserted in both fiber optic lines between each of the switches. For simplicity in FIG. 2, only the modulators 80 and 82 are shown between switches 20 and 34 and are associated with both fibers 24 and 26 respectively, it being understood that similar modulators would be placed between each pair of switches out to the last switch 44.

Modulators 80 and 82, which may be of any available type and which may operate to change any one or more of the amplitude, phase and polarization characteristics., are shown in FIG. 2 to be activated by signals on lines 84 and 86 respectively connected to the bias voltage input 22. When activated, modulators 80 and 82 will be driven by signal generators 90 and 92 respectively to change desired light characteristics passing therethrough and when not activated, to either pass light without alteration or vary the characteristics in a different way so that any light emerging in the wrong fiber will have a different characteristic than the light emerging from the correct fiber. The activation of the modulators 80 and 82 is accomplished by the signal on line 22 and on lines 84 and 86 because this signal is indicative of the desired switch condition. By this means, the modulator associated with the fiber which should not have light therein will be activated so that undesirable leakage light will be affected by the modulator. Accordingly, for example, if one were to command a "throughput" condition for switch 20, one would desire to change a characteristic of the light passing through upper fiber 26 since this would be the undesirable leakage light. The voltage on lines 22 and 86, which would be such as to cause switch 20 to "through put"
the light from the input 12, would activate modulator 82. Assuming also that in the "through put" condition it was desired to pass the light through fiber 24 without modification, the "through put" signal on lines 22 and 84 would deactivate modulator 80. Thus any leakage light entering the switch 34 in fiber 26 would have a different characteristic than the light entering switch 34 from fiber 24. Similarly, if one were to command a "crossover" condition for switch 20, one would desire to change the characteristic of the light passing through lower fiber 24 since this would be the undesirable leakage light. The voltage on lines 22 and 84, which would be such as to cause switch 20 to "crossover" the light from the input 12, would activate modulator 80. Assuming also that in the "crossover" condition it was desired to pass the light through upper fiber 26 without modification, the "crossover" signal on lines 22 and 86 would deactivate modulator 82. Thus the leakage light entering the switch 34 in fiber 24 would again have a different characteristic than the light entering switch 34 from fiber 26. It should be understood that both modulators 80 and 82 could be activated to cause different characteristic changes, so long as any leakage light has a characteristic that cannot cause destructive interference and produce a false null. Similar modulators located between other switches in the area shown by dashed lines 41 and 42 would operate in similar fashion with the result that the undesirable leakage light emerging from the final switch 44 would have a characteristic which would prevent destructive interference and false nulls.

It is therefore seen that we have eliminated the problem of false nulls in an optical delay recalibration system. Many alterations will occur those having ordinary skill in the art. For example, while the input has been shown as a single source, one or more additional light sources may be used. Also, while the additional frequency has been shown in FIG. 1 to oscillate over a range, one or more additional fixed frequencies may be presented to the input of the delay circuit. Also, while the above referred to Baldwin et al application has been used as the optical time delay circuit with which the present invention is used, other optical time delay circuits which have an output leakage signal that can be nulled by interference when using a single mode source can be substituted. Accordingly, we do not wish to be limited to the specific structures used in connection with the description of the preferred embodiments.

The embodiments of the invention in which an exclusive property or right is claimed are defined as follows:

1. Apparatus for preventing false nulls in an optical delay circuit having an input and an output and a single mode source of light having a first characteristic, the single mode source of light being capable of producing interference that causes a false null at the output, comprising:
   a signal generator connected to the optical delay circuit to cause the light passing therethrough to have a second characteristic which prevents a false null.

2. Apparatus according to claim 1 wherein the first characteristic is a first frequency and the second characteristic is a second frequency.

3. Apparatus according to claim 1 wherein the first characteristic is at least one chosen from a group consisting of phase, amplitude and polarization.

4. In an optical delay circuit wherein light from a single mode source having first characteristics including a frequency, amplitude, polarization and phase is passed through a series of switches each biased to provide first and second paths for the light one of which causes more delay than the other and wherein the bias for the switches is calibrated by detecting a leakage output in a first of the two paths from the final switch of the series and adjusting the biases so as to null the leakage output, and wherein the leakage output may provide a false null due to destructive interference in the light, the improvement comprising:

signal generating means connected to the delay circuit to provide a second characteristic for any light passing through the delay circuit as a result of undesirable leakage, said second characteristic including at least one chosen from a group of frequency, phase, amplitude and polarization whereby, destructive interference in the light will not result and a false null will be prevented.

5. Apparatus according to claim 4 wherein the single mode source is a laser diode.

6. Apparatus according to claim 4 wherein the second characteristic is a second frequency and the signal generating means includes a varying current driver connected to the laser diode to bias the laser diode.

7. Apparatus according to claim 4 wherein the second characteristic is a second phase and the signal generating means includes a phase modulator.

8. Apparatus according to claim 4 wherein the second characteristic is a second amplitude and the signal generqating means includes an amplitude modulator.

9. Apparatus according to claim 4 wherein the second characteristic is a second polarization and the signal generating means includes a polarization modulator.

10. Apparatus according to claim 7 wherein the amplitude modulator is activated by the bias.

11. Apparatus according to claim 8 wherein the phase modulator is activated by the bias.

12. Apparatus according to claim 9 wherein the polarization modulator is activated by the bias.

13. The method of preventing false nulls in a optical delay system which uses a plurality of switches each biased to cause light from a single mode light source having a first characteristic including frequency, amplitude, polarization and phase to travel through one of a plurality of paths having different amounts of delay and wherein a leakage output signal from the system, which is normally indicative of an improper bias to at least one of the switches, is used to calibrate the biases applied to the switches until the leakage current from the system is nulled but wherein the single mode can cause destructive interference resulting in a false null, comprising the steps of:

A. introducing a second characteristic chosen from a group of a second frequency, a second amplitude, a second polarization and a second phase into the light in the delay system; and B. using both the first and second characteristics of light for the leakage output signal so that a false null will not occur.

14. The method of claim 13 wherein step A includes introducing a second frequency into the light from the single mode light source.

15. The method of claim 14 wherein step A includes causing the second frequency to vary.

16. The method of claim 15 wherein the variation of the second frequency is periodic between first and second limits.

17. The method of claim 13 wherein step A includes the introducing of a second phase in the leakage light between each pair of switches.

18. The method of claim 13 wherein step A includes the introducing of a second amplitude in the leakage light between each pair of switches.

19. The method of claim 13 wherein step A includes the introducing of a second polarization in the leakage light between each pair of switches.

20. The method of claim 17 wherein step A further includes the step of controlling the insertion of the second phase in accordance with the bias applied to the previous switch.

21. The method of claim 18 wherein step A further includes the step of controlling the insertion of the second amplitude in accordance with the bias applied to the previous switch.

22. The method of claim 19 wherein step A further includes the step of controlling the insertion of the second polarization in accordance with the bias applied to the previous switch.

23. Apparatus for preventing false nulls in an optical delay circuit having an input and an output and a single mode source of light having a first characteristic, the single mode source of light being capable of producing interference that causes a false null at the output, comprising:

a single mode source of light connected to the input and having a first characteristic, the single mode source of light being capable of producing interference that causes a false null at the output a signal generator connected to the input of the optical delay circuit to cause the first characteristic of the light passing therethrough to be varied over a range of values so as to prevent a false null.

24. In an optical delay circuit wherein light from a single mode source having first characteristics is passed through a series of switches each biased to provide first and second paths for the light one of which causes more delay than the other and wherein the bias for the switches is calibrated by detecting a leakage output in a first of the two paths from the final switch of the series and adjusting the biases so as to null the leakage output, and wherein the leakage output may provide a false null due to destructive interference in the light, the improvement comprising:

signal generating means connected to the delay circuit to provide modulation of the first characteristic over a range of values, said characteristic including at least one chosen from a group of frequency, phase, amplitude and polarization whereby, destructive interference in the light will not result and a false null will be prevented.

25. The method of preventing false nulls in a optical delay system which uses a plurality of switches each biased to cause light from a single mode light source having a first characteristic to travel through one of a plurality of paths having different amounts of delay and wherein a leakage output signal from the system, which is normally indicative of an improper bias to at least one of the switches, is used to calibrate the biases applied to the switches until the leakage current from the system is nulled but wherein the single mode can cause destructive interference resulting in a false null, comprising the steps of:

A. introducing a variation of the first characteristic over a range of values into the light in the delay system, the first characteristic being chosen from a group consisting of frequency, amplitude, polarization, and phase; and B. using the variation of the first characteristics in the leakage output signal so that a false null will not occur.

* * * * *